(12) United States Patent
Lee et al.

(10) Patent No.: US 7,456,819 B2
(45) Date of Patent: Nov. 25, 2008

(54) LAMP DRIVING DEVICE, BACKLIGHT ASSEMBLY AND LIQUID CRYSTAL DISPLAY APPARATUS HAVING THE SAME

(75) Inventors: Inn-Sung Lee, Suwon-si (KR); Seung-Hwan Moon, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 737 days.

(21) Appl. No.: 10/715,169

(22) Filed: Nov. 17, 2003

(65) Prior Publication Data

US 2004/0100438 A1 May 27, 2004

(30) Foreign Application Priority Data

Nov. 20, 2002 (KR) .................. 10-2002-0072490

(51) Int. Cl.
 *G09G 3/36* (2006.01)
 *H05B 37/02* (2006.01)
 *H05B 39/04* (2006.01)
 *H05B 41/36* (2006.01)
 *G05F 1/00* (2006.01)

(52) U.S. Cl. .................. 345/102; 315/224; 315/307

(58) Field of Classification Search .............. 345/102; 315/291, 294, 300, 302, 306, 224, 307
See application file for complete search history.

(56) References Cited

U.S. PATENT DOCUMENTS

| | | | | |
|---|---|---|---|---|
| 5,615,093 A | * | 3/1997 | Nalbant | ............... 363/25 |
| 5,777,439 A | * | 7/1998 | Hua | ................ 315/225 |
| 5,930,126 A | * | 7/1999 | Griffin et al. | ........... 363/37 |
| 6,127,785 A | * | 10/2000 | Williams | ............ 315/224 |
| 6,259,615 B1 | * | 7/2001 | Lin | ..................... 363/98 |
| 6,947,024 B2 | * | 9/2005 | Lee et al. | ............ 345/102 |
| 2002/0003525 A1 | | 1/2002 | Hwang | |
| 2003/0001524 A1 | * | 1/2003 | Lin et al. | ............. 315/312 |
| 2004/0051473 A1 | * | 3/2004 | Jales et al. | ............. 315/276 |

FOREIGN PATENT DOCUMENTS

CN 1368789 9/2002

OTHER PUBLICATIONS

Chinese Office Action and English Translation for Application No. 200310124870.1; Mail date May 11, 2007.

* cited by examiner

*Primary Examiner*—Bipin Shalwala
*Assistant Examiner*—Steven E Holton
(74) *Attorney, Agent, or Firm*—Cantor Colburn LLP (57) ABSTRACT

A lamp driving device includes a power supplying part and a feedback detection part. The power supplying part provides a plurality of lamps electrically connected in parallel to each other with power. The feedback detection part receives current that flows via the lamps to provide the power supplying part with a feedback signal that prevents the power supplying part from providing normal lamps with power, when at least one of the lamps are abnormal. Although one power supply provides all lamps with power, when at least one of the lamps is abnormal, then whole circuit is opened. Thus, excess current does not flow via remaining lamps that are normal. Thus, a life span of the lamps is not reduced, and a lamp driving device is safe.

23 Claims, 8 Drawing Sheets

LAMP DRIVING DEVICE, BACKLIGHT ASSEMBLY AND LIQUID CRYSTAL DISPLAY APPARATUS HAVING THE SAME

CROSS-REFERENCE TO RELATED APPLICATIONS

This application relies for priority upon Korean Patent Application No.2002-72490 filed on Nov. 20, 2002, the contents of which are herein incorporated by reference in its entirety.

BACKGROUND OF THE INVENTION

1. Field of the Invention

The present invention relates to a lamp driving device, and a backlight assembly and a liquid crystal display apparatus having the lamp driving device, and more particularly to a lamp driving device having opening detecting function, a backlight assembly and a liquid crystal display apparatus having the lamp driving device.

2. Description of the Related Art

Generally, a liquid crystal display apparatus is a passive display apparatus that uses an external light so as to display an image. Thus, the liquid crystal display apparatus includes a backlight assembly attached at a backside of the liquid crystal display apparatus.

The backlight assembly requires characters, such as a high luminance, a high efficiency, a uniformity of the luminance, a long life span, a thin thickness, a lightweight, a low cost, etc. For example, a backlight assembly for a portable computer and a monitor of a desktop PC requires especially the long life span and the high efficiency. On the contrary, a backlight assembly for a television set requires especially the high luminance. Further, the backlight assembly for the television set requires a longer life span and a higher luminance than the backlight assembly for the monitor.

In order to satisfy the requirement, a parallel driving method has been researched. In the parallel driving method, one inverter drives a plurality of lamps. In case of the parallel driving method, when one of the lamps is in trouble, a display quality is lowered and the backlight assembly may be on fire. Thus, a feedback is essential.

However, in the parallel driving method in which one inverter drives a plurality of lamps, there is only one return path for a current. Thus, even when one or more lamps are in trouble (or opened), current flows through other normal lamps. That is, the lamp (or lamps) that is in trouble may be detected.

Further, same current flows even when at least one of the lamps is abnormal, so that over current may flow through the other lamps. Thus, the life span of the lamps is reduced, and the lamps generate over heat endangering its safety.

SUMMARY OF THE INVENTION

Accordingly, the present invention is provided to substantially obviate one or more problems due to limitations and disadvantages of the related art.

In one aspect of the present invention, a lamp driving device that detects an abnormality of the lamp and the abnormality is fed back to the lamp driving device so as to prevent normal lamps from having reduced life span.

In another aspect of the present invention, a backlight assembly having the lamp driving device is provided.

In still another aspect of the present invention, a liquid crystal display apparatus having the lamp driving device is provided.

The lamp driving device includes a power supplying part and a feedback detection part. The power supplying part provides a plurality of lamps electrically connected in parallel to each other with power. The feedback detection part receives current that flows via the lamps to provide the power supplying part with a feedback signal that prevents the power supplying part from providing normal lamps with power, when at least one of the lamps is abnormal.

The backlight assembly includes a lamp assembly, a lamp driving part and a receiving container. The lamp assembly includes a plurality of lamps generating a light. The lamp driving part includes i) a power supplying part that provides a plurality of lamps electrically connected in parallel to each other with power and ii) a feedback detection part. The feedback detection part receives current that flows via the lamps to provide the power supplying part with a feedback signal that prevents the power supplying part from providing normal lamps with power, when at least one of the lamps is abnormal. The receiving container receives the lamp assembly and the lamp driving part.

The liquid crystal display apparatus includes the backlight assembly described above and a liquid crystal display panel assembly. The liquid crystal display panel assembly transforms a light generated from the lamps of the backlight assembly into an image.

According to the present invention, although one power supply provides all lamps with power, when at least one of the lamps is abnormal, then whole circuit is opened. Thus, excess current does not flow via remaining lamps that are normal. As a result, a life span of the lamps is not reduced, and a lamp driving device is safe.

Further, the lamp feedback detection part receiving a plurality of lamps and detecting the tube current may be formed on one printed circuit board. Thus, when a backlight assembly adopts the feedback detection part, productivity is enhanced.

BRIEF DESCRIPTION OF THE DRAWINGS

The above and other features and advantage points of the present invention will become more apparent by describing in detailed exemplary embodiments thereof with reference to the accompanying drawings, in which.

DESCRIPTION OF THE PREFERRED EMBODIMENT

Hereinafter, the preferred embodiment of the present invention will be described in detail with reference to the accompanied drawings.

Figure 1:
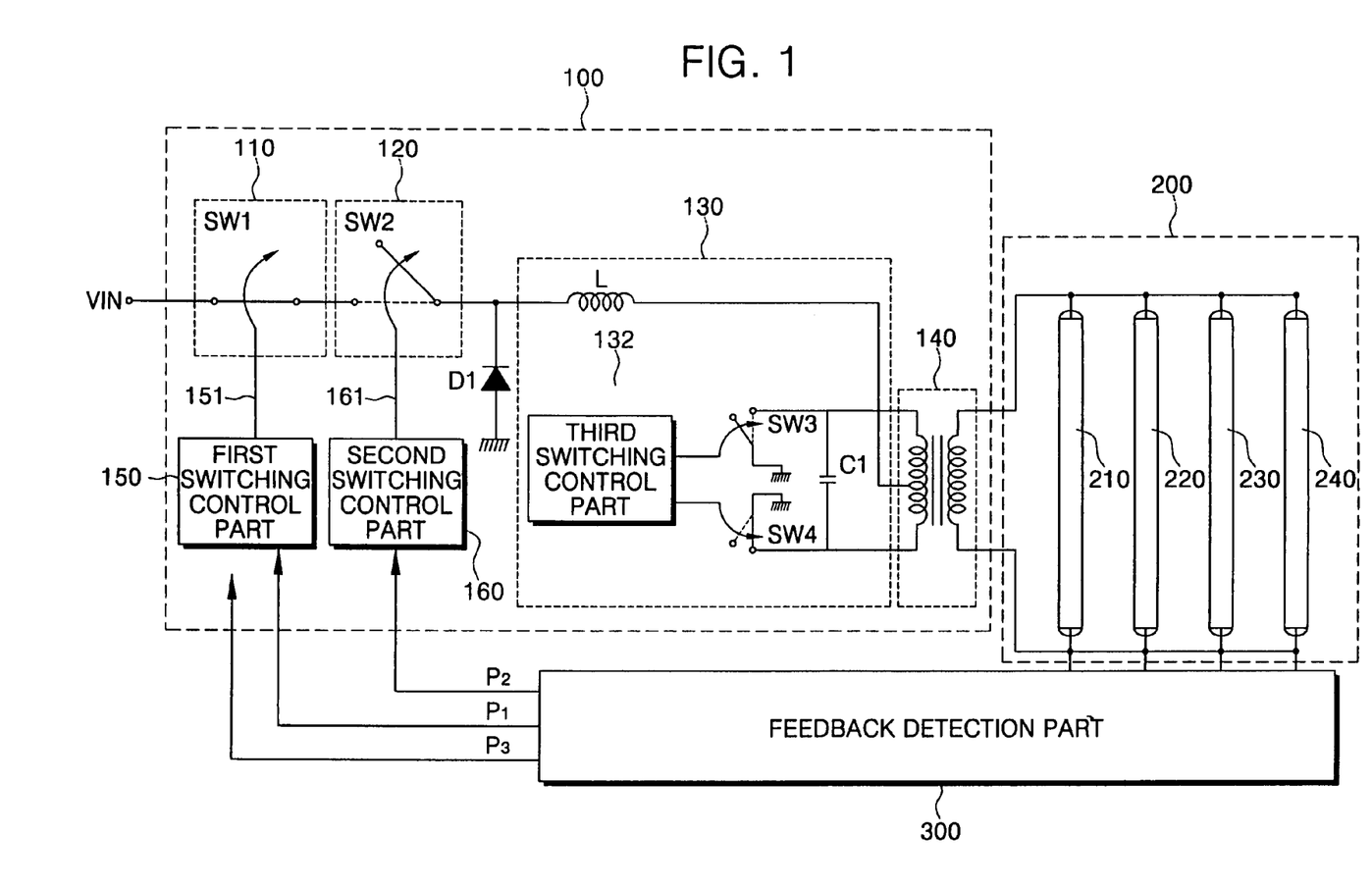
FIG. 1 is a circuit diagram showing a lamp driving device according to an embodiment of the present invention.

FIG. 1 is a circuit diagram showing a lamp driving device according to an embodiment of the present invention.

Referring to FIG. 1, a lamp driving device according to an embodiment of the present invention includes a power supplying part 100 and a feedback detection part 300. The power supplying part 100 provides a lamp assembly 200 with a power. The feedback detection part 300 detects the power applied to the lamp assembly 200 so as to detect whether at least one of lamps is abnormal. When at least one of the lamps is abnormal, the feedback detection part 300 provides an open signal to the power supplying part 100.

The lamp assembly 200 includes a plurality of the lamps. The lamps are electrically connected in parallel to each other. The lamps may include a cold cathode fluorescent lamp (CCFL) that has a lamp tube and two internal electrodes disposed in the lamp tube, an external electrode fluorescent lamp (EEFL) that has a lamp tube and two external electrodes disposed outside of the lamp tube, or an external and internal electrode fluorescent lamp (EIFL) that has a lamp tube, one internal electrode and one external electrode.

The power supplying part 100 includes first and second switching parts 110 and 120, a diode D1, an inverting part 130, a transforming part 140, and first and second switching control parts 150 and 160. The power supplying part 100 provides the lamps 210, 220, 230 and 240 of the lamp assembly 200 with the power. That is, the power supplying part 100 transforms a direct current provided from an external device into an alternating current, and the power supplying part 100 amplifies the alternating current to provide the lamp assembly 200.

Further, an electricity source is fed back to the power supplying part 100, so that the power supplying part 100 controls an electricity source to be in a determined level.

The first switching part 110 includes a first switch SW1. The first switch SW1 connects or opens a current path through which the direct current flows in response to a first switching control signal 151. When all lamps are normal, the first switching part 110 is connected the current path, so that current flows from an external device toward the second switching part 120. However, when one of the lamps is in trouble, the first switching part 110 opens the current path.

The second switching part 120 includes a second switch SW2. The second switch SW2 connects or opens the current path through the direct current flows in response to a second switching control signal 161. When the current path is connected, the current flows from the first switching part 110 toward the inverting part 130. A switch such as a bipolar junction transistor (BJT) and a field effect transistor (FET) may be used for the first and second switches SW1 and SW2.

The diode D1 is electrically connected to a first node between the second switching part 120 and the inverting part 130, and the diode D1 is electrically connected to a second node corresponding to a ground voltage. In detail, the diode D1 includes a cathode that is electrically connected to an output terminal of the second switching part 120, and an anode that is electrically connected to the ground voltage to prevent an inrush current generated from the inverting part from flowing toward the second switch SW2.

The inverting part 130 includes a reactor L, a capacitor C1, third and fourth switches SW3 and SW4 and a third switching control part, so that the inverting part 130 transforms a direct current generated by the second switching part 120 into an alternating current. The alternating current is applied to the transforming part 140. The capacitor C1 is electrically connected in parallel to the transforming part 140. The capacitor C1 is electrically connected to the third and fourth switches SW3 and SW4 that are electrically connected to the ground voltage respectively.

The inverting part 130 may be embodied via a Royer inverter, so that detailed description will be omitted.

The transforming part 140 corresponds to a transformer that has first and second coils. The transforming part 140 transforms a low level alternating current that is applied to the first coil into a high level alternating current via the second coil. The high level alternating current is applied to the lamp assembly 200.

The first switching control part 150 receives a feedback signal P1 when at In least one of lamps 210, 220, 230 and 240 is abnormal, so that the first switching control part 150 applies the first switching control signal 151 to the first switching part 110 so as to turn off the first switching part 110.

For example, the first switching control part 150 turns on the first switching part 110 when a high level feedback signal P1 is applied to the first switching control part 150, and the first switching control part 150 turns off the first switching part 110 when a low level feedback signal P1 is applied to the first switching part 150. When the first switching control signal 151 that turns on the first switching part 110 corresponds to a high level, and the first switching control signal 151 that turns off the first switching part 110 corresponds to a low level, the first switch SW1 is formed preferably via N-type MOSFET. On the contrary, when the first switching control signal 151 that turns on the first switching part 110 corresponds to a low level, and the first switching control signal 151 that turns off the first switching part 110 corresponds to a high level, the first switch SW1 is formed preferably via P-type MOSFET.

When an alternating current outputted from the transforming part changes, the opening detecting part 300 generates a signal corresponding to a change of the alternating current. The signal is transferred to the second switching control part 160. The second switching control part 160 compares the signal corresponding to the change of the alternating current with a predetermined reference signal to generates a detection signal. The detection signal corresponding to a second switching control signal 161 is applied to the second switching part 120.

The lamp assembly 200 includes a plurality of lamps 210, 220, 230 and 240 that are electrically connected in parallel with each other. The plurality of lamps 210, 220, 230 and 240 receive the alternating current transformed to be a high level to generate a light.

The feedback detection part 300 receives a feedback current from the lamps 210, 220, 230 and 240. When at least one of the lamps 210, 220, 230 and 240 corresponds to a low level, the feedback detection part 300 provides the first switching control part 150 with the feedback signal P1 to control the first switching part 110. In FIG. 1, four lamps are described for example. However, more or less lamps may be used.

As described above, when one power supplying device (or inverter) drives a plurality of lamps, the power supplying device controls a rated current that is applied to the lamps. When at least one of the lamps is abnormal, the feedback detection part 300 detects an amount of current to break circuit. Thus, an excess current is not applied to the remained lamps, so that a life span of the lamps is not reduced.

Figure 2:
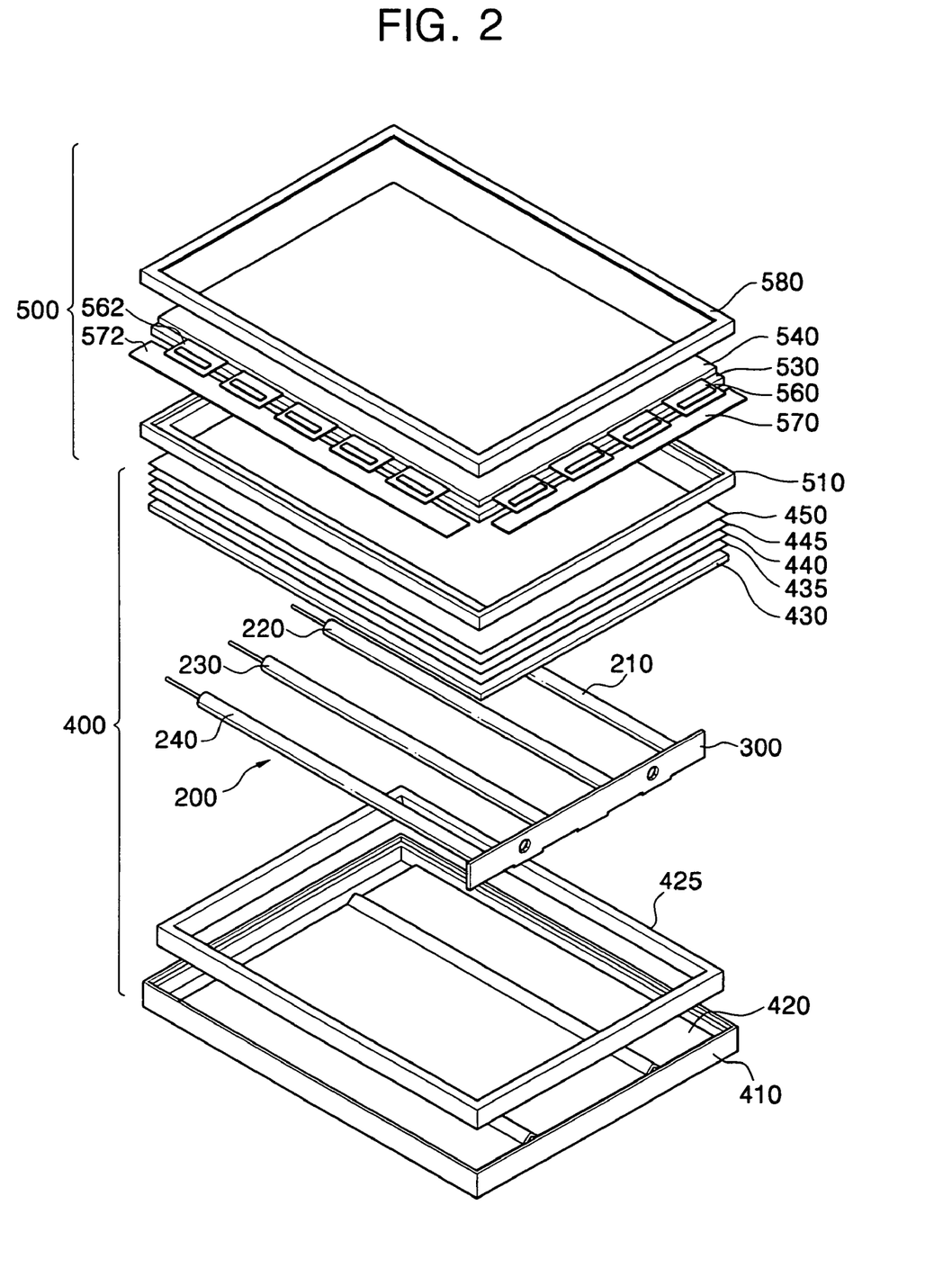
FIG. 2 is a perspective view showing a liquid crystal display apparatus according to another embodiment of the present invention.
Figure 3:
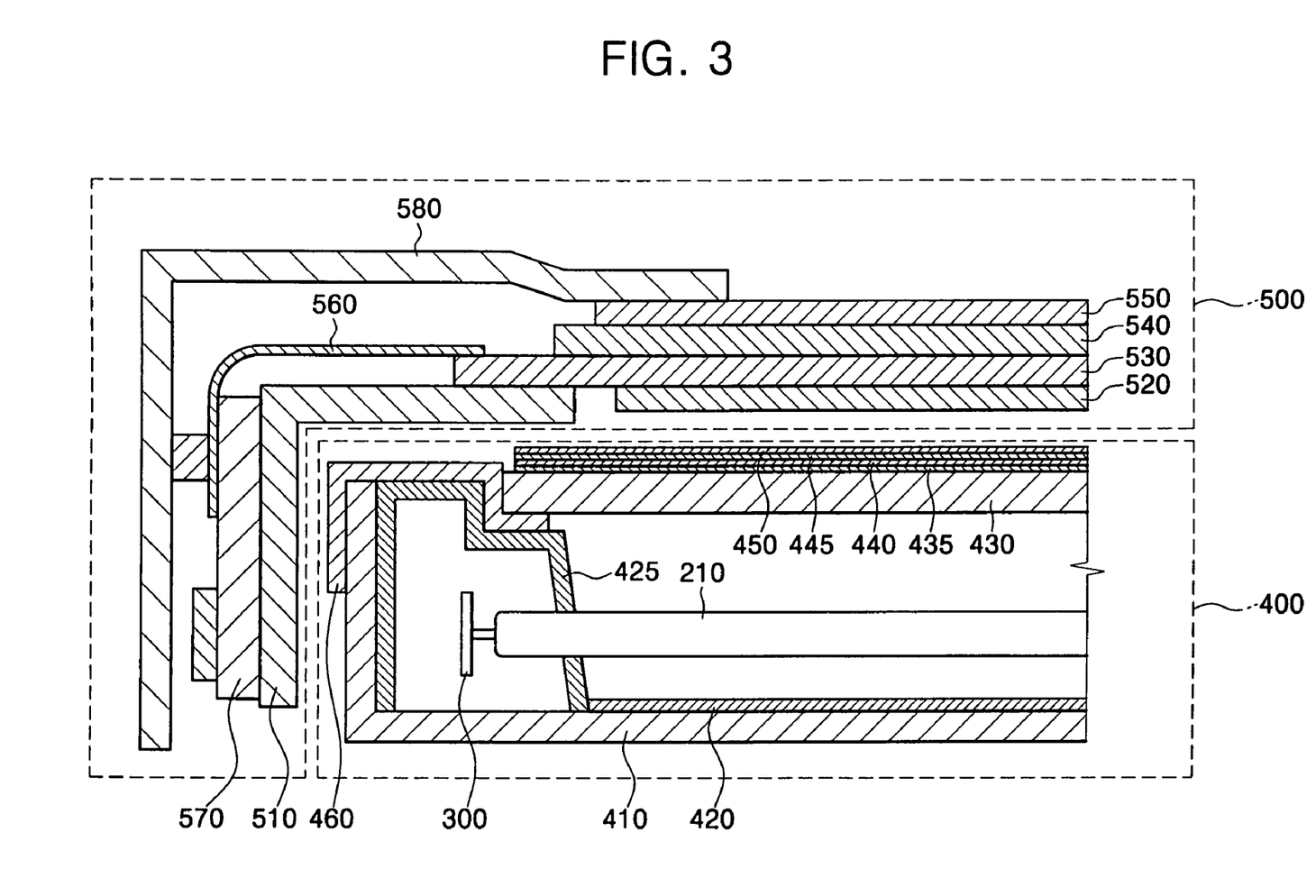
FIG. 3 is a cross-sectional view showing a liquid crystal display apparatus of FIG. 2.
Figure 4:
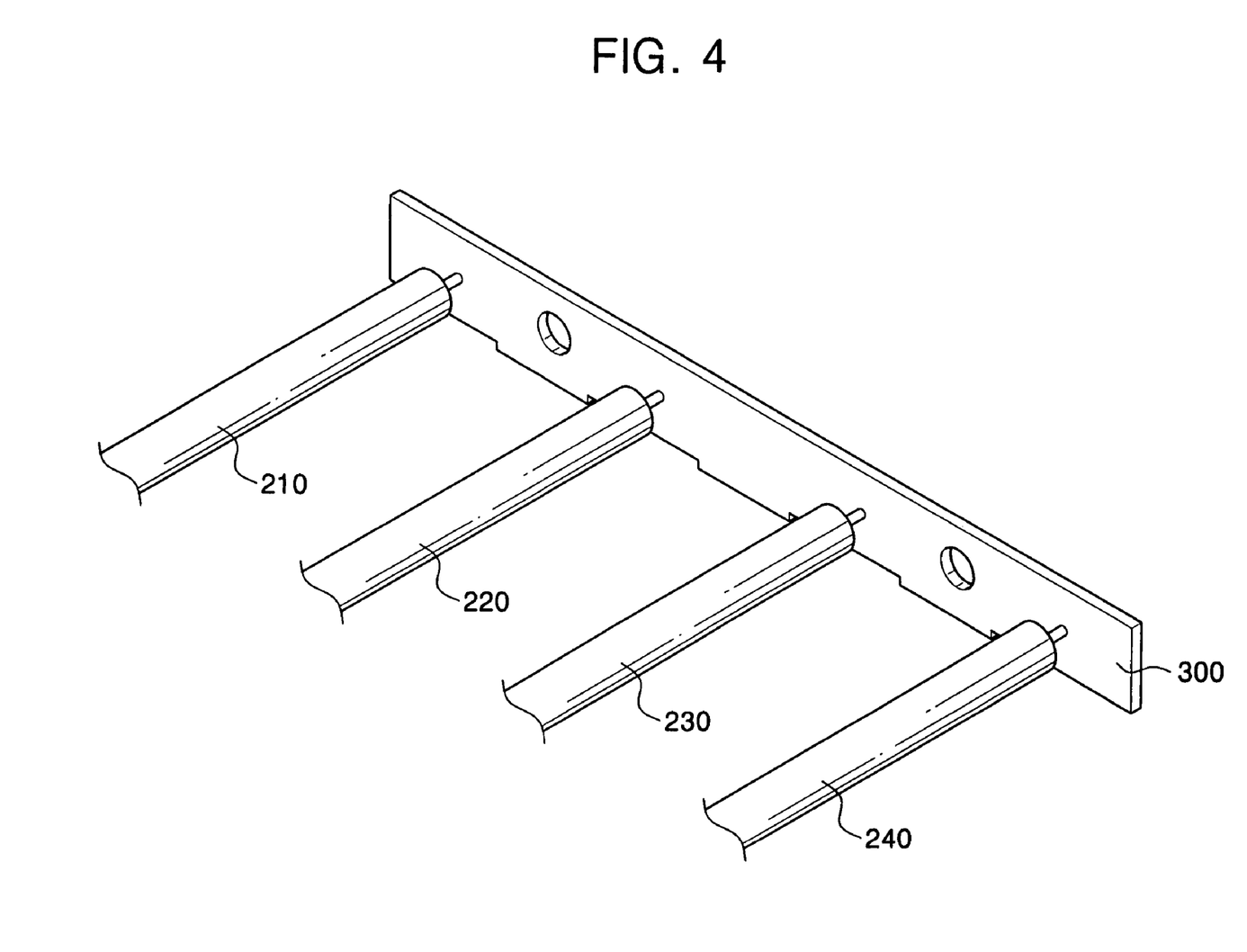
FIG. 4 is a perspective view showing a feedback detection part of FIG. 2.

FIG. 2 is a perspective view showing a liquid crystal display apparatus according to another embodiment of the present invention. FIG. 3 is a cross-sectional view showing a liquid crystal display apparatus of FIG. 2, and FIG. 4 is a perspective view showing a feedback detection part of FIG. 2.

Referring to FIGS. 1 to 4, a liquid crystal display apparatus according to an exemplary embodiment of the present invention includes a backlight assembly 400 and a liquid crystal display panel assembly 500. The backlight assembly 400 provides the liquid crystal display panel assembly 500 with a light. The liquid crystal display panel assembly uses the light to display an image.

The backlight assembly 400 includes a bottom chassis 410, a reflection plate 420, a lamp assembly 200, a lower mold 425, a diffusion plate 430, a diffusion sheet 435, first and second prism sheets 440 and 445, a protection sheet 450, a feedback detection part 300 and an upper mold 460.

The bottom chassis 410 has a rectangular shape corresponding to the liquid crystal display panel assembly 500. The bottom chassis 410 has a space for receiving the reflection plate 420, a lamp assembly 200 and a lower mold 425.

The diffusion plate 430, the diffusion sheet 435, the first and second prism sheets 440 and 445, and the protection sheet 450 are disposed over the bottom is chassis 410 in sequence, such that the diffusion plate 430, the diffusion sheet 435, the first and second prism sheets 440 and 445, and the protection sheet 450 are disposed on the bottom chassis 410 are spaced apart from the lamps 210, 220, 230 and 240 so as to be prevented from heat generated by the lamps 210, 220, 230 and 240.

The reflection plate 420 is disposed on a bottom face of the bottom chassis 410, so that the reflection plate 420 reflects light toward the liquid crystal display panel assembly 500. The reflection plate 420 may have a rectangular plate shape. The reflection plate 420 may include a groove for receiving a wire through which voltage is applied to the lamp assembly 200.

The lamp assembly 200 including lamps 210, 220, 230 and 240 is disposed over the reflection plate 420. The lamp assembly 200 provides the liquid crystal display panel assembly 500 with a light.

The lower mold 425 includes a pair of first walls and a pair of second sidewalls. The first sidewalls and the second sidewalls are perpendicular to each other, so that the lower mold 425 has a rectangular frame shape. The lower mold 425 fixes the reflection plate 420 and the lower mold 425 receives hot electrode and a cold electrode of the lamps 210, 220, 230 and 240. A hole formed on the second sidewall receives the hot electrode and the cold electrode. The lower mold 425 having the first and second sidewalls receives the feedback detection part 300 that is electrically connected to the wire drawn out from the hot electrode and the cold electrode. Preferably, the feedback detection part 300 is formed on a printed circuit board receiving a first end of a lamp unit. The printed circuit board is erected as shown in FIG. 3.

The lower mold 425 further includes a reflector (not shown) that is disposed inside of the lower mold 425 so as to reflect a light toward the liquid crystal display panel.

The diffusion plate 430 and the diffusion sheet 435 are spaced apart from the lamp assembly 200. The diffusion plate 430 and the diffusion sheet 435 diffuse a light generated from the lamp assembly 200 so as to uniformize a luminance of the light.

The first and second prism sheets 440 and 445 condense the light diffused by the diffusion plate 430 and diffusion sheet 435.

The protection sheet 450 protects the second prism sheet 445. That is, the protection sheet 450 prevents dusts from adhering to the second prism sheet 445.

The light that exits from the protection sheet 450 enters the liquid crystal display panel assembly 500.

The upper mold 460 is disposed on the bottom chassis 410. The upper mold 460 supports the diffusion plate 430, and the upper mold 460 is combined with the bottom chassis 410 to prevent the diffusion plate from being floating and separating from the backlight assembly 400. The upper mold 460 also fixes the diffusion sheet 435, the first and second prism sheets 440 and 445, and the protection sheet 450.

The liquid crystal display panel assembly 500 includes a middle chassis 510, a first polarizing plate 520, an array substrate 530, a color filter substrate 540, a liquid crystal layer (not shown) interposed between the array substrate 530 and the color filter substrate 540, a second polarizing plate 550, a gate tape carrier package (hereinafter, referred to as gate TCP) 560, a data tape carrier package (hereinafter, referred to as data TCP) 562, a gate printed circuit board (hereinafter, referred to as gate PCB) 570, a data printed circuit board (hereinafter, referred to as data PCB) 572, and a top chassis 580 that combined with the bottom chassis 410 of the backlight assembly 400. The liquid crystal display panel assembly 500 receives a light generated from the backlight assembly 400, and displays an image.

The middle chassis 510 surrounds the upper mold 460 of the backlight assembly 400, so that the middle chassis 510 compresses the diffusion plate 430, and optical sheets 435, 440, 445 and 450 to fix the diffusion plate 430, and optical sheets 435, 440, 445 and 450. The middle chassis 510 also supports the array substrate 530.

The first polarizing plate 520 polarizes a light generated from the backlight assembly 400 to form a first polarized light.

The array substrate 530 and the color filter substrate 540 are combined together, and the liquid crystal layer (not shown) is interposed between the array substrate 530 and the color filter substrate 540. The first polarized light passes through the array substrate 530, a liquid crystal layer and the color filter substrate 540.

When electric fields are applied to the liquid crystal layer, a transmissivity of the liquid crystal layer is adjusted. The first polarized light sequentially passes through the array substrate 530, the liquid crystal layer, the color filter substrate 540 and the second polarizing plate 550, so that the second polarizing plate 550 polarizes the first polarized light to form a second polarized light.

A first end of the gate TCP 560 is connected to an ineffective display region of the array substrate 530, and a second end of the gate TCP 560 is connected to the gate PCB 570 to transfer an image signal generated from the gate PCB 570 to the array substrate 530.

The top chassis 580 surrounds the second polarizing plate 550, and the top chassis 580 is combined with the middle chassis 510 or the bottom chassis 410 to prevent the first polarizing plate 520, the array substrate 530, the color filter substrate 540 and the second polarizing plate 550 from being separated.

Figure 5:
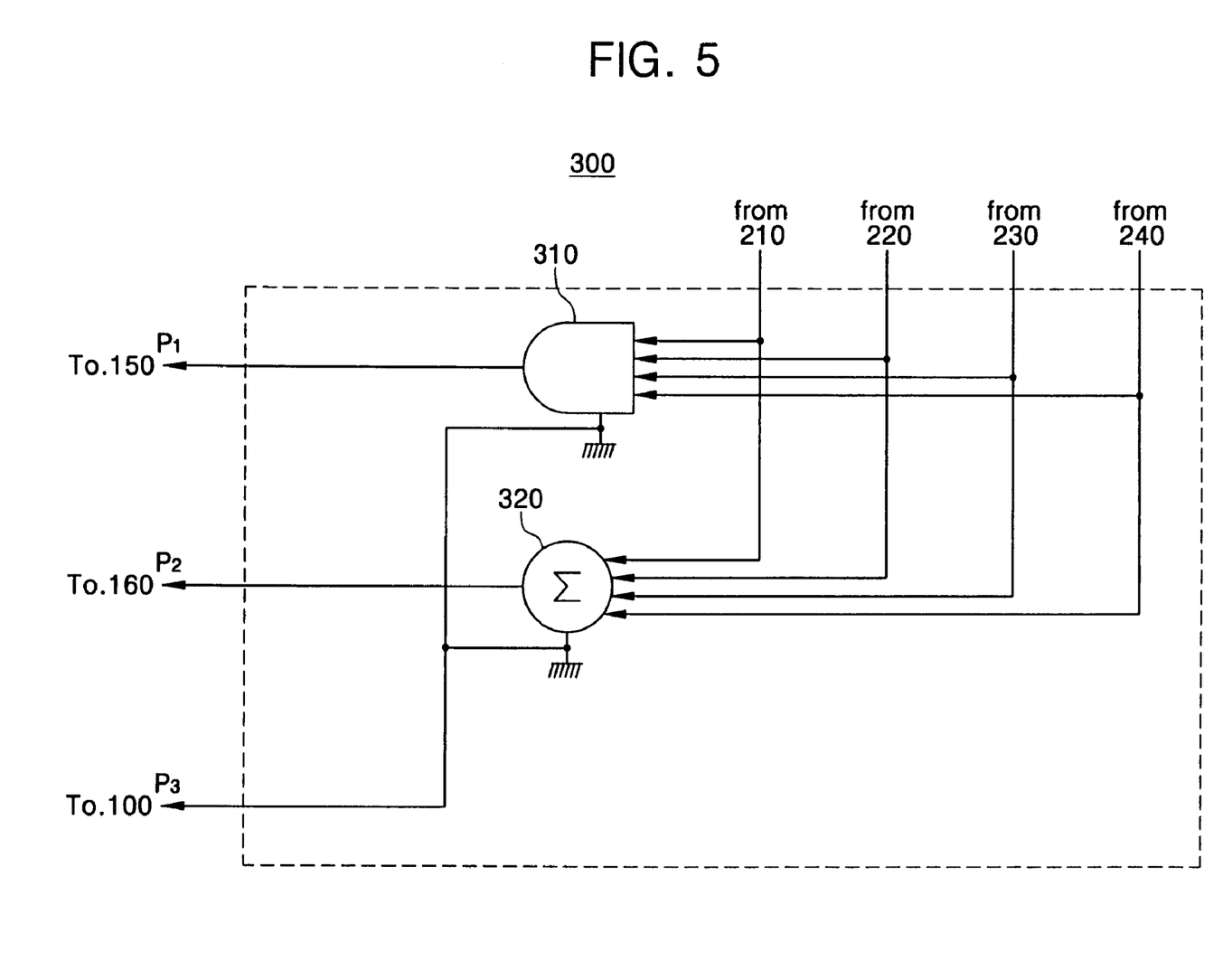
FIG. 5 is a schematic diagram showing an operation of a feedback detection part of FIG. 1.

FIG. 5 is a schematic diagram showing an operation of a feedback detection part of FIG. 1.

Referring to FIGS. 1 and 5, the feedback detection part 300 includes an AND gate 310 and an adder 320. The feedback detection part 300 controls the power supplying part 100 to turn on or turn off the power supplying part 100. The feedback detection part 300 also controls a level of voltage that is applied to the lamp assembly 200.

When the first to fourth lamps 210, 220, 230 and 240 provide the AND gate 310 with a signal respectively, the AND gate 310 outputs the feedback signal P1 of a first level. When one of the lamps 210, 220, 230 and 240 is in trouble, so that one of the signal is abnormal, the AND gate 310 outputs the feedback signal P1 of a second level. The feedback signal P1 is applied to the first switching control part 150.

Thus, for example, when the first lamp 210 is abnormal, the feedback detection part 300 provides the first switching control part 150 with the feedback signal P1, so that an excess current may not flow via the second, third and fourth lamps 220, 230 and 240. Thus, a life span of the second, third and fourth lamps 220, 230 and 240 is not reduced.

The adder 320 sums a feedback signal from the first to fourth lamps 210, 220, 230 and 240 to form a summed signal P2. The summed signal P2 is transferred to the second switching part 160.

Thus, problems occurring due to an excess or shortage of an electricity source applied to the lamps 210, 220, 230 and 240 are solved. In FIG. 5, the feedback detection part 300 is formed via one AND gate 310 and one adder 320. However, the feedback detection part 300 may be embodied via various logic gates.

Then, hereinafter, an exemplary circuit of the feedback detection part will be explained.

Figure 6:
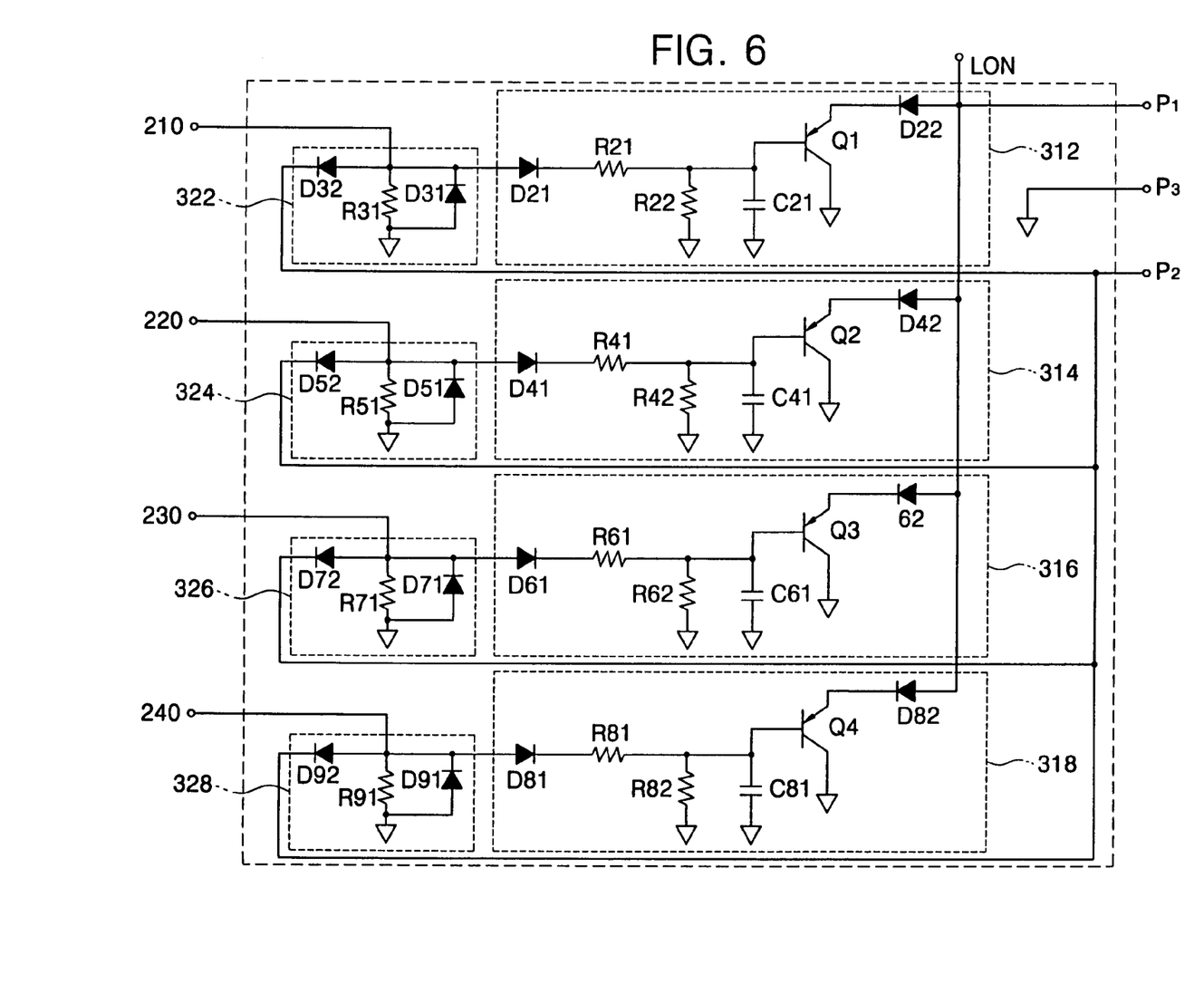
FIG. 6 is a circuit diagram showing a feedback detection part of FIG. 1.

FIG. 6 is a circuit diagram showing a feedback detection part of FIG. 1. The feedback detection part of FIG. 6 corresponds to four lamps for example.

Referring to FIGS. 1 and 6, the feedback detection part 300 includes first, second, third and fourth pull down sections 312, 314, 316 and 318, and first, second, third and fourth tube current detection sections 322, 324, 326 and 328. The feedback detection part 300 detects a tube current flowing through a tube of each lamp. The feedback detection part 300 outputs a first feedback signal P1 according to an opening of the lamp, and the feedback detection part 300 outputs also a tube current sum P2 of the lamps.

A ground port P3 of the feedback detection part 300 is electrically connected to a ground port of the power supplying part 100, so that the feedback detection part 300 and the power supplying part 100 are electrically connected to the same ground voltage.

The first pull down section 312 includes first and second diodes D21 and D22, first and second resistors R21 and R22, a capacitor C21 and a first transistor Q1. The first pull down section 312 receives a tube current of the first lamp 210 and reference voltage LON, so that the first pull down section 312 outputs the feedback signal P1 that is in a high level or in a low level in response to the tube current. The feedback signal P1 is transferred to the first switching control part 150. In detail, the tube current having half wave is applied to the first diode D21, and the tube current is rectified via the first and second resistors R21 and R22, and the capacitor C21. The rectified tube current is applied to a base electrode of the first transistor Q1. The reference voltage LON is applied to an emitter electrode of the first transistor Q1. The first transistor Q1 is turned on or off according to the level of the tube current that is applied to the base electrode. When the first transistor Q1 is turned on, the reference voltage LON applied to the emitter electrode is drained via a collector electrode that is connected to the ground voltage, so that a low leveled feedback signal P1 is applied to the first switching control part 150.

When the first transistor Q1 is turned off, the reference voltage LON is outputted as the high leveled feedback signal P1. The high leveled feedback signal is applied also to the first switching control part 150.

The first tube current detection section 322 includes third and fourth diodes D31 and D32, and a third resistor R31. The first tubes current detection section 322 is electrically connected to the first lamp 210 so as to detect tube current, and the first tube current detection section 322 provides the second switching control part 160 with the detected tube current.

The second pull down section 314 includes first and second diodes D41 and D42, first and second resistors R41 and R42, a capacitor C41 and a second transistor Q2. The second pull down section 314 receives a tube current of the second lamp 220 and reference voltage LON, so that the second pull down section 314 outputs the feedback signal P1 that is in a high level or in a low level in response to the tube current. The feedback signal P1 is transferred to the first switching control part 150. In detail, the tube current having half wave is applied to the first diode D41, and the tube current is rectified via the first and second resistors R41 and R42, and the capacitor C41. The rectified tube current is applied to a base electrode of the second transistor Q2. The reference voltage LON is applied to an emitter electrode of the second transistor Q2. The second transistor Q2 is turned on or off according to the level of the tube current that is applied to the base electrode. When the second transistor Q2 is turned on, the reference voltage LON applied to the emitter electrode is drained via a collector electrode that is connected to the ground voltage, so that a low leveled feedback signal P1 is applied to the first switching control part 150.

When the second transistor Q2 is turned off, the reference voltage LON is outputted as the high leveled feedback signal P1. The high leveled feedback signal is applied also to the first switching control part 150.

The second tube current detection section 324 includes third and fourth diodes D51 and D52, and a third resistor R51. The second tubes current detection section 324 is electrically connected to the second lamp 220 so as to detect tube current, and the second tube current detection section 324 provides the second switching control part 160 with the detected tube current.

The third pull down section 316 includes first and second diodes D61 and D62, first and second resistors R61 and R62, a capacitor C61 and a transistor third Q3. The third pull down section 316 receives a tube current of the third lamp 230 and reference voltage LON, so that the third pull down section 316 outputs the feedback signal P1 that is in a high level or in a low level in response to the tube current. The feedback signal P1 is transferred to the first switching control part 150. In detail, the tube current having half wave is applied to the first diode D61, and the tube current is rectified via the first and second resistors R61 and R62, and the capacitor C61. The rectified tube current is applied to a base electrode of the third transistor Q3. The reference voltage LON is applied to an emitter electrode of the third transistor Q3. The third transistor Q3 is turned on or off according to the level of the tube current that is applied to the base electrode. When the third transistor Q3 is turned on, the reference voltage LON applied to the emitter electrode is drained via a collector electrode that is connected to the ground voltage, so that a low leveled feedback signal P1 is applied to the first switching control part 150.

When the third transistor Q3 is turned off, the reference voltage LON is outputted as the high leveled feedback signal P1. The high leveled feedback signal is applied also to the first switching control part 150.

The third tube current detection section 326 includes third and fourth diodes D71 and D72, and a third resistor R71. The third tubes current detection section 326 is electrically connected to the third lamp 230 so as to detect tube current, and the third tube current detection section 326 provides the second switching control part 160 with the detected tube current.

The fourth pull down section 318 includes first and second diodes D81 and D82, first and second resistors R81 and R82, a capacitor C81 and a fourth transistor Q4. The fourth pull down section 318 receives a tube current of the fourth lamp 240 and reference voltage LON, so that the fourth pull down section 318 outputs the feedback signal P1 that is in a high level or in a low level in response to the tube current. The feedback signal P1 is transferred to the first switching control part 150. In detail, the tube current having half wave is applied to the first diode D81, and the tube current is rectified via the first and second resistors R81 and R82, and the capacitor C81. The rectified tube current is applied to a base electrode of the fourth transistor Q4. The reference voltage LON is applied to an emitter electrode of the fourth transistor Q4. The fourth transistor Q4 is turned on or off according to the level of the tube current that is applied to the base electrode. When the fourth transistor Q4 is turned on, the reference voltage LON applied to the emitter electrode is drained via a collector electrode that is connected to the ground voltage, so that a low leveled feedback signal P1 is applied to the first switching control part 150.

When the fourth transistor Q4 is turned off, the reference voltage LON is outputted as the high leveled feedback signal P1. The high leveled feedback signal is applied also to the first switching control part 150.

The fourth tube current detection section 328 includes third and fourth diodes D91 and D92, and a third resistor R91. The fourth tubes current detection section 328 is electrically connected to the fourth lamp 240 so as to detect tube current, and the fourth tube current detection section 328 provides the second switching control part 160 with the detected tube current.

Preferably, ground terminals of the first to fourth pull down sections 312, 314, 316 and 318, and the first to fourth tube current detection sections 322, 324, 326 and 328 are connected to a common ground voltage. More preferably, the ground terminals are electrically connected to the ground terminals of the power supplying part 100.

As explained above, the feedback detection part outputs a low leveled feedback signal when a tube current flows via tubes of the lamps. The feedback detection part outputs a high leveled feedback signal when the tube current does not flow through one of the tubes of the lamps. Thus, the feedback detection part detects an operation of each of the lamps.

Figure 7:
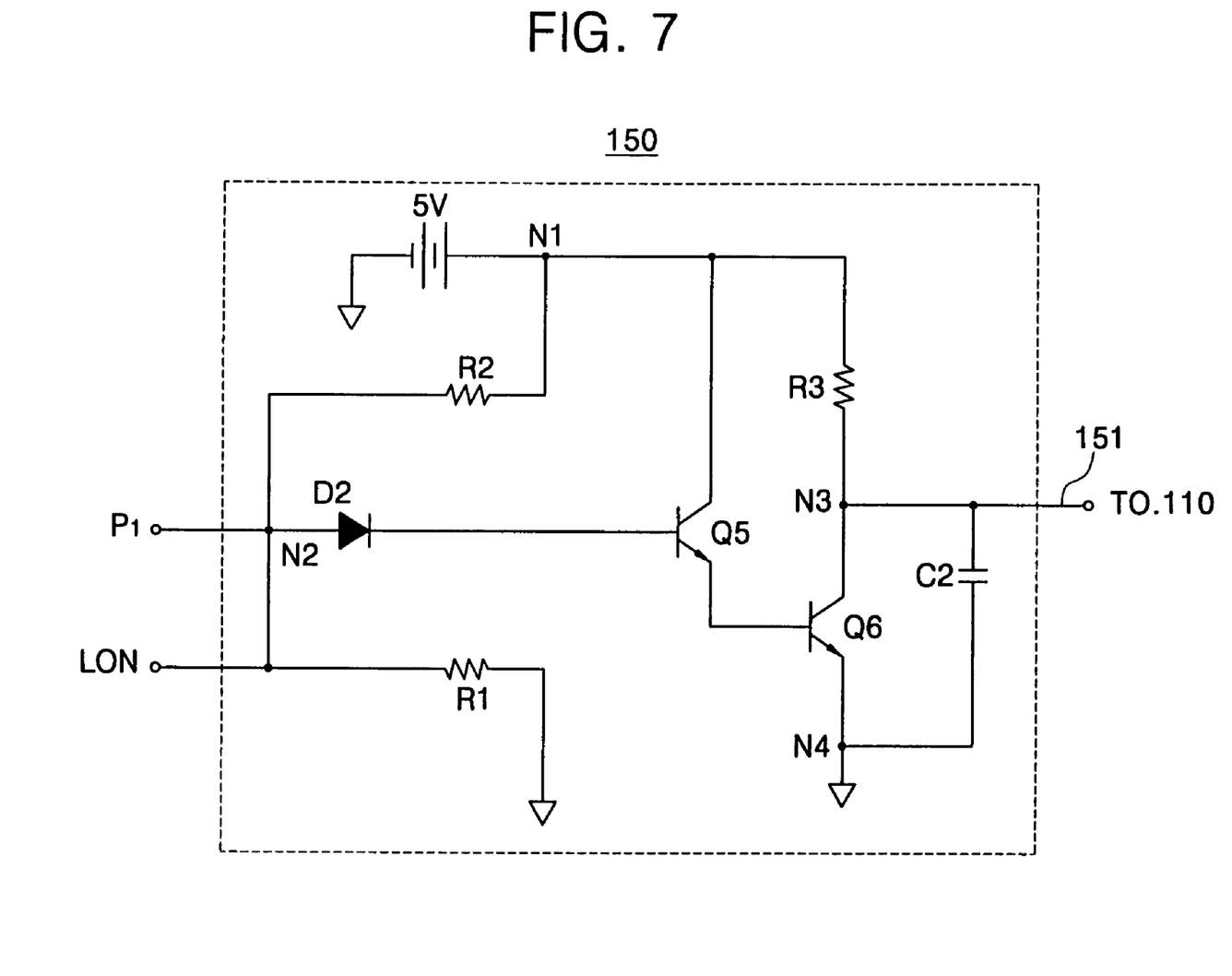
FIG. 7 is a circuit diagram showing a first switching control part of FIG. 1.

FIG. 7 is a circuit diagram showing a first switching control part of FIG. 1.

Referring to FIG. 7, a first switching control part 150 includes a diode D2, first, second and third resistors R1, R2 and R3, a voltage source, fifth and sixth transistors Q5 and Q6, and a capacitor C2. A cathode of the voltage source is electrically connected to a ground voltage, and an anode of the voltage source is electrically connected to a first node N1. The second resistor R2 electrically connects the first node N1 to a second node N2. An anode electrode of the diode D2 is electrically connected to the second node N2, and a cathode electrode of the diode D2 is electrically connected to a base electrode of the fifth transistor Q5. A collector electrode of the fifth transistor Q5 is electrically connected to the first node N1, and an emitter electrode of the fifth transistor Q5 is electrically connected to a base electrode of the sixth transistor Q6. A collector electrode of the sixth transistor Q6 is electrically connected to a third node N3, and an emitter electrode of the sixth transistor Q6 is electrically connected to a fourth node N4 that is electrically connected to a ground voltage. The third resistor R3 electrically connects the third node N3 to the first node N1. The capacitor C2 electrically connects the third node N3 to the fourth node N4. A first end of the first resistor R1 is electrically connected to the second node N2, and a second end of the first resistor R1 is electrically connected to a ground voltage.

The first switching control part 150 outputs the first switching signal 151 via a collector electrode of the sixth transistor Q6 so as to turn on or turn off the first switching part 110 in response to the feedback signal P1 provided from the feedback detection part 300 via the diode D2.

When the feedback signal P1 is in a low level, the fifth and sixth transistors Q5 and Q6 are turned off, so that a voltage provided from the voltage source is outputted via the collector electrode of the sixth transistor Q6. Thus, the first switching signal 151 is in a high level. The high leveled signal 151 turns on the first switching part 110, so that an electricity source VIN provided from an external device is continuously applied to the second switching part 120.

When the feedback signal P1 is in a high level, the fifth and sixth transistors Q5 and Q6 are turned on, so that a voltage provided from the voltage source is drained via the emitter electrode of the sixth transistor Q6. Thus, a low leveled first switching signal is outputted via the collector electrode of the sixth transistor Q6. The low leveled signal 151 turns off the first switching part 110, so that an electricity source VIN is not applied to the second switching part 120.

Hereinbefore, when all lamps operate normally, the feedback signal P1 provided from the feedback detection part 300 is set to be in a low level, and when at least one of the lamps is abnormal, the feedback signal P1 is set to be in a high level. However, the feedback signal P1 may be set to be inverse. That is, when all lamps operate normally, the feedback signal P1 may be set to be in a high level, and when at least one of the lamps is abnormal, the feedback signal P1 may be set to be in a low level.

Figure 8:
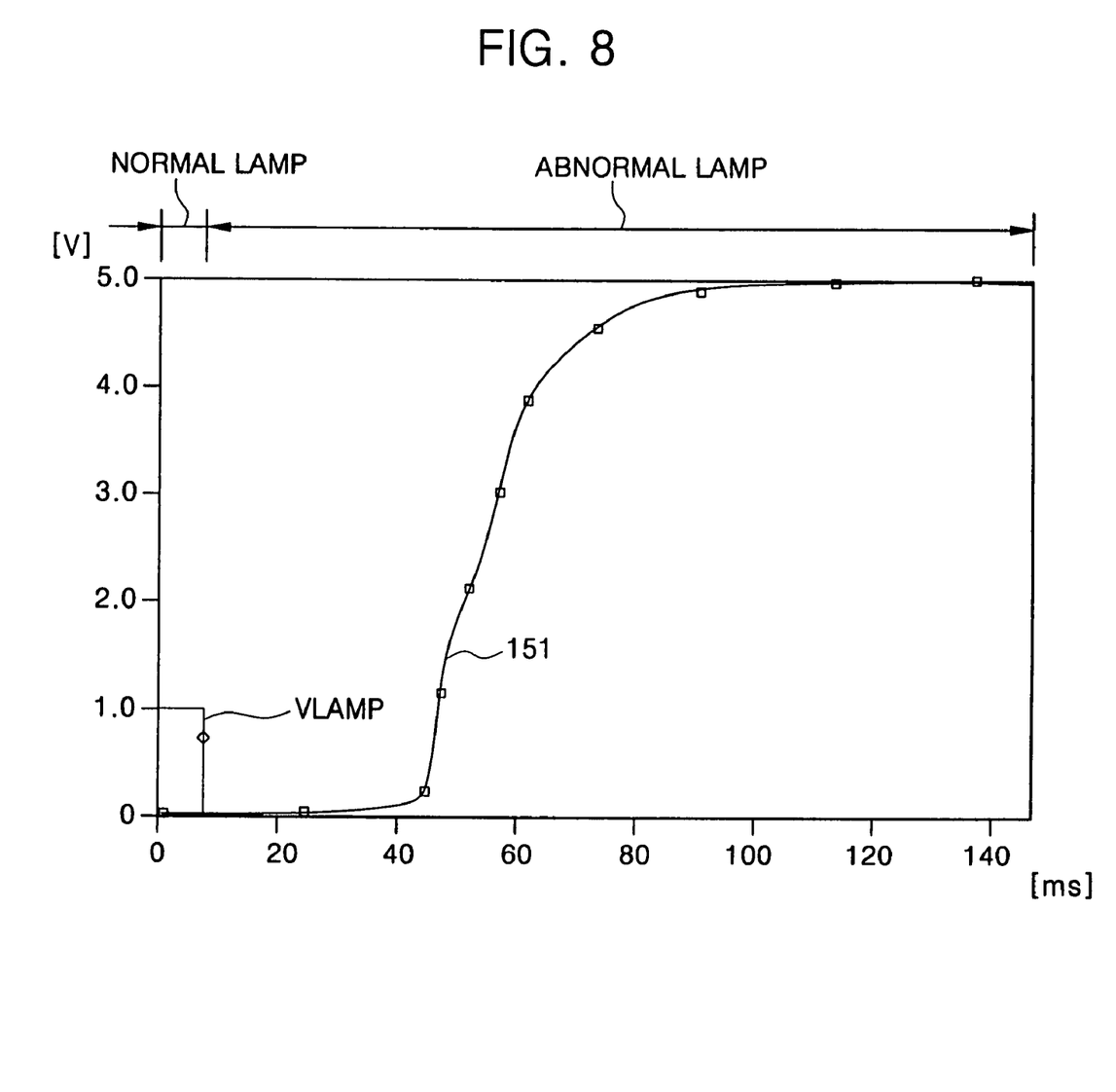
FIG. 8 is a graph showing a result of simulation according to the present invention.

FIG. 8 is a graph showing a result of simulation according to the present invention. Especially, FIG. 8 shows a voltage when one of lamps is abnormal.

Referring to FIG. 8, when all lamps 210, 220, 230 and 240 of the lamp assembly 200 operate normally, the feedback detection part 300 detects high leveled voltage Vlamp of the lamp. When at least one of the lamps 210, 220, 230 and 240 is abnormal, the voltage Vlamp of the lamp drops to be in a low level.

When the voltage Vlamp is in a low level, the first switching control part 150 provides the first switching part 110 with a first switching control signal 151 that is transformed from a low level to a high level. The first switching part 110 in a turned on state is turned off according to the high leveled first control signal 151. Thus, a power provided from an external device is not provided to remaining lamps that are in normal state, so that an excess current does not flow via the remaining lamps.

Having described the exemplary embodiments of the present invention and its advantages, it is noted that various changes, substitutions and alterations can be made herein without departing from the spirit and scope of the invention as defined by appended claims.

As described above, although one power supply provides all lamps with power, when at least one of the lamps is abnormal, then whole circuit is opened. Thus, excess current does not flow via remaining lamps that are normal. As a result, a life span of the lamps is not reduced, and a lamp driving device is safe.

Further, the lamp feedback detection part receiving a plurality of lamps and detecting the tube current may be formed on one printed circuit board. Thus, when a backlight assembly adopts the feedback detection part, productivity is enhanced.

What is claimed is:

1. A lamp driving device comprising:
   a power supplying part that provides a plurality of lamps electrically connected in parallel to each other with power; and
   a feedback detection part, the feedback detection part receiving current that flows via the lamps to provide the power supplying part with a feedback signal that prevents the power supplying part from providing normal lamps with power, when at least one of the lamps is abnormal,
   wherein the feedback detection part includes an AND operation section that receives currents that flow in each of the lamps, so that the AND operation section provides the power supplying part with the feedback signal when at least one of the currents is out of a predetermined range.

2. The lamp driving device of claim 1, wherein the feedback detection part sums the currents that flow in each of the lamps to form a summed current, and the feedback detection part provides the power supplying part with the summed current.

3. The lamp driving device of claim 1, wherein the power supplying part comprises:
   a first switching part that connects or opens a current path through which a direct current provided from an external device flows;
   an inverting part that transforms the direct current into a first alternating current;
   a transforming part that transforms the first alternating current that is in a low level state to a second alternating current that is in a high level state to provide the lamps with the second alternating current; and
   a first switching control part that provides the first switching part with a first switching control signal to turn off the first switching part, when the first switching control part receives the feedback signal from the feedback detection part.

4. The lamp driving device of claim 3, wherein the first switching control part comprises a diode, first, second and third resistors, a voltage source, first and second transistors and a capacitor, a) a cathode of the voltage source is electrically connected to a ground voltage and an anode of the voltage source is electrically connected to a first node, b) the second resistor electrically connects the first node to a second node, c) an anode electrode of the diode is electrically connected to the second node and a cathode electrode of the diode is electrically connected to a base electrode of the first transistor, d) a collector electrode of the first transistor is electrically connected to the first node and an emitter electrode of the first transistor is electrically connected to a base electrode of the second transistor, e) a collector electrode of the second transistor is electrically connected to a third node and an emitter electrode of the second transistor is electrically connected to a fourth node that is electrically connected to a ground voltage, f) the third resistor electrically connects the third node to the first node, g) the capacitor electrically connects the third node to the fourth node, and h) a first end of the first resistor is electrically connected to the second node and a second end of the first resistor is electrically connected to a ground voltage.

5. The lamp driving device of claim 3, wherein the power supplying part further comprises:
   a second switching part that connects or opens a current path through which a direct current provided from the first switching part device flows toward the inverting part; and
   a second switching control part that receives a signal from the feedback detection part, the signal corresponding to a sum of the currents that flow each of the lamps, the second switching control part comparing the signal with a predetermined reference signal to form a second switching control signal, and the second switching control part providing the second switching part with the second switching control signal.

6. The lamp driving device of claim 1, wherein the feedback detection part further includes
   an adding section that sums the currents that flow in each of the lamps to provide the power supplying part with the feedback signal made of the sum of the currents that flow in each of the lamps.

7. The lamp driving device of claim 6, wherein the AND operation section outputs the feedback signal, when one of the currents that flows in each of the lamps is below the predetermined range.

8. The lamp driving device of claim 6, wherein the power supplying part, the AND operation section and the adding section are commonly grounded.

9. The lamp driving device of claim 1, wherein the feedback detection part detects an opening of the lamps.

10. The lamp driving device of claim 1, wherein the feedback detection part controls an amount of current that flows in each lamp.

11. A backlight assembly comprising:
    i) a lamp assembly that includes a plurality of lamps generating a light;
    ii) a lamp driving part including:
    a power supplying part that provides a plurality of lamps electrically connected in parallel to each other with power; and
    a feedback detection part receiving current that flows via the lamps to provide the power supplying part with a feedback signal that prevents the power supplying part from providing normal lamps with power, when at least one of the lamps is abnormal; and
    iii) a receiving container that receives the lamp assembly and the lamp driving part,
    wherein the feedback detection part includes an AND operation section that receives currents that flow in each of the lamps, so that the AND operation section provides the power supplying part with the feedback signal when at least one of the currents is out of a predetermined range.

12. The backlight assembly of claim 11, wherein the feedback detection part sums the currents that flow each of the lamps to form a summed current, and the feedback detection part provides the power supplying part with the summed current.

13. The backlight assembly of claim 11, wherein the power supplying part comprises:
    a first switching part that connects or opens a current path through which a direct current provided from an external device flows;
    an inverting part that transforms the direct current into a first alternating current;
    a transforming part that transforms the first alternating current that is in a low level state to a second alternating current that is in a high level state to provide the lamps with the second alternating current; and
    a first switching control part that provides the first switching part with a first switching control signal to turn off the first switching part, when the first switching control part receives the feedback signal from the feedback detection part.

14. The backlight assembly of claim 13, wherein the first switching control part comprises a diode, first, second and third resistors, a voltage source, first and second transistors and a capacitor, a) a cathode of the voltage source is electrically connected to a ground voltage and an anode of the voltage source is electrically connected to a first node, b) the second resistor electrically connects the first node to a second node, c) an anode electrode of the diode is electrically connected to the second node and a cathode electrode of the diode is electrically connected to a base electrode of the first transistor, d) a collector electrode of the first transistor is electrically connected to the first node and an emitter electrode of the first transistor is electrically connected to a base electrode of the second transistor, e) a collector electrode of the second transistor is electrically connected to a third node and an emitter electrode of the second transistor is electrically connected to a fourth node that is electrically connected to a ground voltage, f) the third resistor electrically connects the third node to the first node, g) the capacitor electrically connects the third node to the fourth node, and h) a first end of the first resistor is electrically connected to the second node and a second end of the first resistor is electrically connected to a ground voltage.

15. The backlight assembly of claim 13, wherein the power supplying part further comprises:
a second switching part that connects or opens a current path through which a direct current provided from the first switching part device flows toward the inverting part; and
a second switching control part that receives a signal from the feedback detection part, the signal corresponding to a sum of the currents that flow each of the lamps, the second switching control part comparing the signal with a predetermined reference signal to form a second switching control signal, and the second switching control part providing the second switching part with the second switching control signal.

16. The backlight assembly of claim 11, wherein the feedback detection part further includes
an adding section that sums the currents that flow each of the lamps to provide the power supplying part with the feedback signal made of the sum of the currents that flow in each of the lamps.

17. The backlight assembly of claim 16, wherein the AND operation section outputs the feedback signal, when one of the currents that flows in each of the lamps is below the predetermined range.

18. The backlight assembly of claim 16, wherein the power supplying part, the AND operation section and the adding section are commonly grounded.

19. The backlight assembly of claim 11, wherein the feedback detection part is formed on a printed circuit board attached to each of the lamps.

20. The backlight assembly of claim 19, wherein the receiving container comprises:
a first receiving container including a bottom plate and a first sidewall protruding from an edge of the bottom plate; and
a second receiving container including a second sidewall, the second receiving container being disposed inside of the first receiving container, the lamps penetrating the second sidewall so that the printed circuit board is disposed between the first and second sidewalls.

21. The backlight assembly of claim 11, wherein each lamp corresponds to either a cold cathode fluorescent lamp (CCFL) that has a lamp tube and two internal electrodes disposed in the lamp tube, an external electrode fluorescent lamp (EEFL) that has a lamp tube and two external electrodes disposed outside of the lamp tube, or a external and internal electrode fluorescent lamp (EIFL) that has a lamp tube, one internal electrode and one external electrode.

22. A liquid crystal display apparatus comprising:
a backlight assembly including i) a lamp assembly that includes a plurality of lamps generating a light, and ii) a lamp driving part having a) a power supplying part that provides a plurality of lamps electrically connected in parallel to each other with power, and b) a feedback detection part, the feedback detection part receiving current that flows via the lamps to provide the power supplying part with a feedback signal that prevents the power supplying part from providing normal lamps with power, when at least one of the lamps is abnormal; and
a liquid crystal display panel assembly that transforms a light generated from the lamps of the backlight assembly into an image,
wherein the feedback detection part includes an AND operation section that receives currents that flow in each of the lamps, so that the AND operation section provides the power supplying part with the feedback signal when at least one of the currents is out of a predetermined range.

23. The liquid crystal display apparatus of claim 22, wherein the feedback detection part is formed on a printed circuit board.

* * * * *